March 14, 1939.　　　　R. E. NEWELL　　　　2,150,722
THERMOSTAT
Filed Jan. 29, 1931
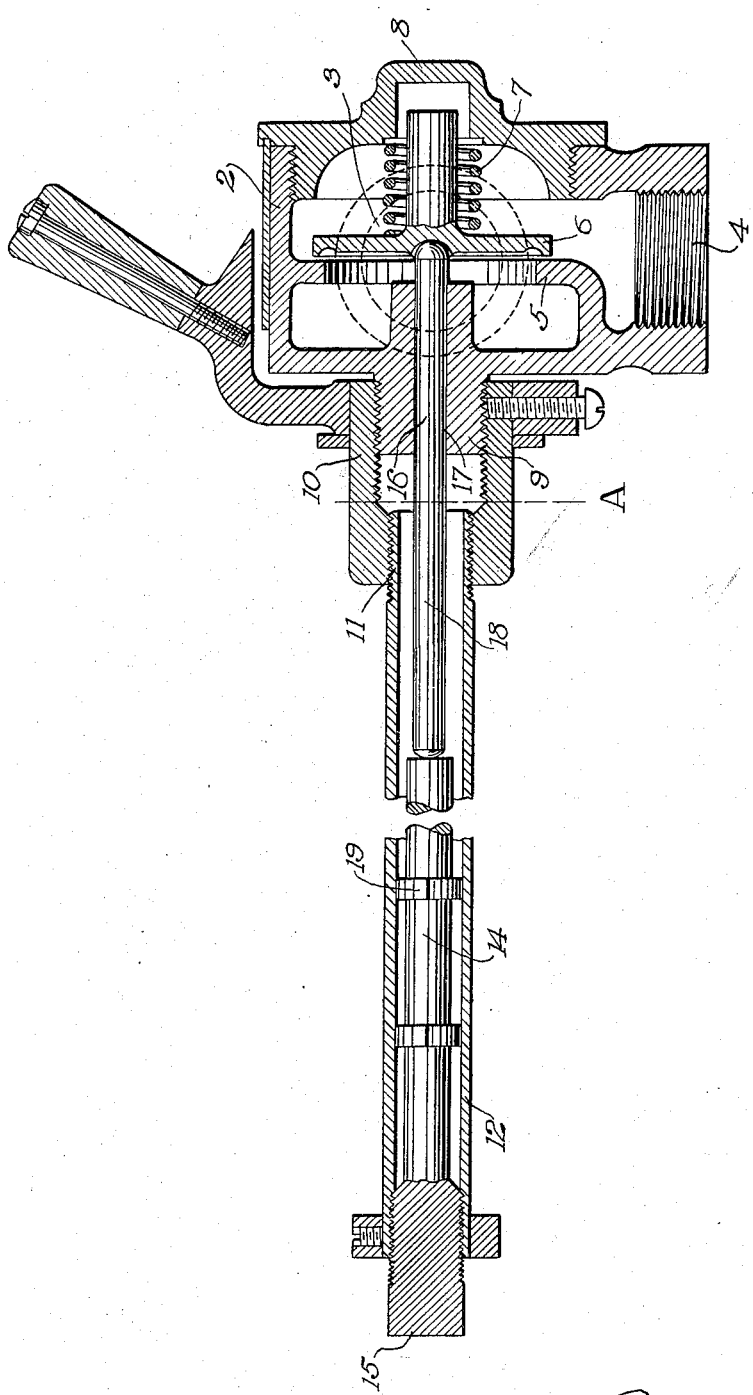
INVENTOR
Robert E. Newell Patented Mar. 14, 1939

2,150,722

UNITED STATES PATENT OFFICE 2,150,722

THERMOSTAT

Robert E. Newell, Irwin, Pa., assignor to Robertshaw Thermostat Company, Youngwood, Pa., a corporation of Pennsylvania Application January 29, 1931, Serial No. 512,052

2 Claims. (Cl. 236—102)

The present invention relates broadly to heat responsive mechanisms, and more particularly to such mechanisms as applicable to the control of valves, switches, and the like thermostatically.

In the ordinary type of structure to which the present invention relates, it is customary to provide a heat responsive mechanism including a lineal expanding element coupled with a relatively non-expanding element. One of such elements is coupled to a body portion which is usually of expansible material and which carries the valve, switch or other mechanism the movement of which it is desired to effect and control.

By way of illustration only, the invention will be described in connection with a thermostatic valve, it being understood, however, that the utility is not limited either to the particular type of valve structure or to the use of a valve as the controlling member.

One of the important uses of thermostatic valves is in connection with domestic ovens. For a considerable period of time it has been observed that the operation of the thermostats varies with different ovens, thereby making it necessary to effect an adjustment or compensation arbitrarily in accordance with the oven with which the thermostat is to be used. In ordinary cases, a given thermostat applied to different ovens and subjected to different heat conditions may vary in its characteristic operation through a temperature range of as much as 20° or even more. Because of this, it has been impractical heretofore for a manufacturer to arbitrarily set a thermostat at the factory in such manner as to provide a setting accurate for different makes of ovens. Such a compensation or correction adjustment has necessarily been made by the stove manufacturer in accordance with the characteristics of the stove on which the thermostat is to be placed.

I have found that the principal reason for the variation or error referred to is due to the expansion or contraction of the body portion of the structure. With the ordinary valve, such body portion comprises a comparatively heavy casting of brass or similar material which itself tends to expand or contract in response to the temperature conditions which the thermostat is designed to control. Where the body portion is formed of comparatively heavy casting, and the changes of temperature are rapid in either direction, the body portion not only tends to lag behind such temperature changes by an appreciable amount, but there is an appreciable temperature difference between the external and internal portions of the valve body. The slowness of the body portion to heat or cool causes considerable variation in the degree or accuracy of control of the thermostat for reasons which will be obvious. Variations of the character referred to tend to develop two unsatisfactory conditions which may be characterized generally as a fluctuation in control and which are commercially designated as "under-shooting" and "over-shooting".

In accordance with the present invention, it is proposed to provide a thermostatic structure having incorporated therein compensating means whereby the body variations will be effectively neutralized in such manner that a given structure may be utilized in any one of a wide number of different locations, or under different conditions, with assurance that it will give the accuracy of control desired.

The single figure of drawing illustrates diagrammatically one embodiment of my invention in which compensating means of the character referred to is incorporated, the figure showing a type of thermostatic valve of generally well known construction.

By way of illustration only, I have shown in the accompanying drawing the invention as applicable to a valve of the general type illustrated in Robertshaw Patent 1,567,081 of December 29, 1925. In the illustrated embodiment, the thermostat comprises a supporting body 2 which, as before stated, is conveniently in the form of a metal casting, relatively heavy, and therefore more or less sluggish in its response to rapidly varying temperature conditions. The body form a valve casing providing inlet and outlet connections 3 and 4 between which is a seat 5 adapted to cooperate with a controlling member 6 in the form of a valve for cutting off communication between the ports. This valve is normally urged in a direction toward the seat by a suitable means such as a spring 7. Access to the casing for inspection or renewal of the parts, and for insertion of the valve, is permitted by removal of a cap 8, such cap being removable without changing the setting of any of the thermostat parts.

Extending rearwardly from the supporting body or valve casing is a projection 9 having a threaded outer surface. This thread, which may be either single or double, is preferably of comparatively steep pitch. Cooperatively threaded thereon is a revolving couple or adapter 10 having one end provided with an internal thread corresponding to the threads on the projection 9, and having its opposite end internally threaded with a thread of different pitch, such as a standard thread, adapted to receive the threaded end 11 of an expanding element 12. Such expanding element, as is customary in the art, may comprise a couple or brass tube subject to lineal changes in dimension in accordance with varying temperature conditions.

Within the expansible member 12 is a relatively non-expansible member 14 of suitable material abutting at one end against an adjusting and closing plug 15 and at the opposite end abutting against a pressure transmitting pin 16. This pin extends through a suitable opening 17 in the valve body and is in abutting engagement with the valve 6.

While the pin 16 performs the usual functions of a pressure transmitting means effective intermediate the relatively non-expansible member and the valve, as is common in thermostats of this general type, it is also of such special dimensions as to serve in the capacity of a compensator. For this purpose it is considerably elongated, as will be apparent from the drawing, so as to provide an end portion 18 projecting into the metallic casing 12 an appreciable distance. The pin is preferably of a material similar to that of which the body 2 is formed, and conveniently of brass having substantially the same coefficient of expansion as both the body 2 and the tube 12. Due to this type of pin and its projection into the tube 12, it absorbs heat from the tube in that portion which projects into the tube and conducts the heat gradually through its entire length, including the portion within the valve body. This tends to gradually expand the pin under conditions of increasing temperature at a rate which is substantially commensurate with the rate of expansion of the body 2.

While the body 2 is of greater mass and therefore absorbs heat relatively slowly under rapid temperature changes, the pin 16 is located somewhat more remotely from the heat so that its own rate of dimensional change is of the order stated. Due to this fact, the expansion of the pin tends to lift the valve 6 from its seat at approximately the same rate of speed that the expansion of the valve body 2 tends to move the seat toward the valve. An equilibrium or compensation is thus automatically effected. There is thus provided a structure in which the movement of the valve is substantially responsive only to the relative difference in dimensional changes in the tube 12 and the rod 14 therein. The objectionable temperature variations are thus substantially completely eliminated and it is possible to calibrate the thermostat at the factory in such manner that it responds accurately to the different conditions encountered in different installations and regardless of whether the conditions of use are such that the thermostat itself is subjected to much or little heat. This makes it possible either to completely locate the thermostat within an oven for example, or so mount it that part of it projects into the oven and part of it extends exteriorly of the oven.

I have further found that the degree of accuracy may be improved by maintaining the relatively non-expansible rod 14 in slightly spaced relationship to the tube 12. In ordinary structures the non-expansible rod is permitted to lie along the tube throughout substantially its length. In accordance with the present invention, I preferably surround the rod with split spacing rings 19 of brass or similar material capable of withstanding the temperature conditions to which the thermostat is subjected and serving to provide a limited area of contact only between the rod and the tube such that the heat absorption of the rod is minimized and such heat rendered available for inducing temperature changes of the order referred to in the pin 16.

For purposes of visual comparison, it may be assumed that the pin 16 normally extends outwardly to a position substantially as indicated by the dotted line A. From the drawing it will be obvious that the pin is materially extended beyond such position for the purpose of accomplishing the new function of compensation.

To those skilled in the art it will be apparent that the advantages of the present invention reside in the fact that there is provided a thermostat susceptible of universal use under a wide variety of different temperature conditions with reasonable assurance that it will respond substantially accurately to such conditions and maintain the temperature range for which it is set by the user.

While I have herein illustrated more or less diagrammatically one preferred embodiment of the invention, it will be understood that the utility of the invention is not limited to valves nor to valves of the type shown, it being apparent that changes in the construction and operation of the parts in accordance with the principal disclosed herein may be made without departing either from the spirit of the invention or the scope of my broader claims.

I claim:

1. In a thermostatic apparatus for controlling the temperature of an oven or the like, the combination of a casing, a stationary element and a movable element in the casing for regulating the supply of heat to said oven, a thermostat responsive to the temperature of the oven and acting to move the movable element in one direction relative to the stationary element upon a rise in temperature in the oven, an adjusting handle connected with the movable element in any adjusted position for adjusting it relative to the stationary element, a second thermostat operatively connected to said movable element and acting to move it in the opposite direction upon a rise in temperature outside the oven for increasing the supply of heat to the oven, and a connection between the adjusting handle and the movable element including said second thermostat permitting movement of said element by either of said thermostats without movement of the adjusting means.

2. In a thermostatic apparatus for controlling the temperature of an oven or the like, the combination of a control member for regulating the heating of the oven, a plurality of thermostats operatively connected to the control member, one of said thermostats being responsive to the temperature of the oven and acting to move the member in one direction upon a rise of temperature in the oven and the other thermostat being responsive to temperatures outside the oven and acting to move the member in the other direction upon a rise of temperature, and means for adjusting the control member, the connections between said adjusting means and the control member and between the thermostats and the control member permitting movement of the said control member by the thermostats without movement of the adjusting means and permitting continuance of the operation of the oven thermostat in one direction after the control member has been moved to a position in which its movement is arrested.

ROBERT E. NEWELL.